Feb. 23, 1971  P. F. CATAPANO  3,564,890
ATTITUDE-DISPLACEMENT INDICATOR

Filed Jan. 19, 1970  3 Sheets-Sheet 1

INVENTOR.
PATRICK F. CATAPANO
BY
ATTORNEY

Feb. 23, 1971        P. F. CATAPANO        3,564,890

ATTITUDE-DISPLACEMENT INDICATOR

Filed Jan. 19, 1970        3 Sheets-Sheet 2

INVENTOR.
PATRICK F. CATAPANO
BY

ATTORNEY

Feb. 23, 1971   P. F. CATAPANO   3,564,890
ATTITUDE-DISPLACEMENT INDICATOR
Filed Jan. 19, 1970   3 Sheets-Sheet 3

INVENTOR.
PATRICK F. CATAPANO
BY
ATTORNEY

United States Patent Office 3,564,890
Patented Feb. 23, 1971

3,564,890
ATTITUDE-DISPLACEMENT INDICATOR
Patrick F. Catapano, Paramus, N.J., assignor to The Bendix Corporation, a corporation of Delaware
Continuation-in-part of application Ser. No. 665,031, Sept. 1, 1967. This application Jan. 19, 1970, Ser. No. 3,678
Int. Cl. G01c 23/00
U.S. Cl. 73—178
9 Claims

ABSTRACT OF THE DISCLOSURE

A flight instrument providing an integrated navigational display for guiding an aircraft during cruising and during runway approach and landing modes of flight. The integrated display includes the attitude of the craft with respect to the earth's horizon, the displacement of the craft with respect to navigational beams and the attitude steering commands necessary to guide the aircraft along a desired flight path to intercept the nagivational beams.

CROSS REFERENCE TO RELATED APPLICATIONS

This application is a continuation-in-part of U.S. application Ser. No. 665,031, filed Sept. 1, 1967 by Patrick F. Catapano and assigned to The Bendix Corporation, assignee of the present application, now abandoned.

BACKGROUND OF THE INVENTION

Field of the invention

This invention relates to instruments for guiding aircraft and, more particularly, to a flight instrument providing an integrated display showing the attitude of the craft and the displacement of the craft relative to navigational beams.

Description of the prior art

Prior to the present invention separate displays were required for presenting attitude and displacement information for guiding aircraft. Navigational displays of this type are disadvantageous since the entire display must be scanned and parallax errors occur in reading the attitude and displacement information.

SUMMARY OF THE INVENTION

The flight instrument of the present invention includes a sphere mounted to move about a first axis in accordance with the displacement of the craft from a localizer beam and mounted to move about second and third axis in accordance with the pitch and roll attitude, respectively, of the craft. The sphere includes a centrally disposed center band extending circumferentially therearound in a plane parallel to the first axis and which center band has a symbol representing glide slope and localizer beam centers. The center band is mounted for independent movement about the second axis in accordance with the displacement of the craft from a glide slope beam. Steering bars move vertically and move about the third axis for presenting pitch and roll steering commands.

One object of this invention is to provide a flight instrument displaying information for guiding an arcraft while the aircraft is cruising and while the craft is approaching a runway and landing.

Another object of this invention is to remove the approach and landing display from the flight instrument when cruising information is displayed.

Another object of this invention is to provide an integrated display of attitude and displacement information for guiding the aircraft.

Another object of this invention is to display the attitude of the craft with respect to the earth's horizon, the displacement of the craft with respect to navigational beams and the attitude steering commands necessary for buiding the aircraft along a desired flight path.

Another object of this invention is to roll stabilize said displacement display with the earth's horizon.

Another object of this invention is to display the attitude and displacement of the craft with reference to a single symbol to minimize parallax errors.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
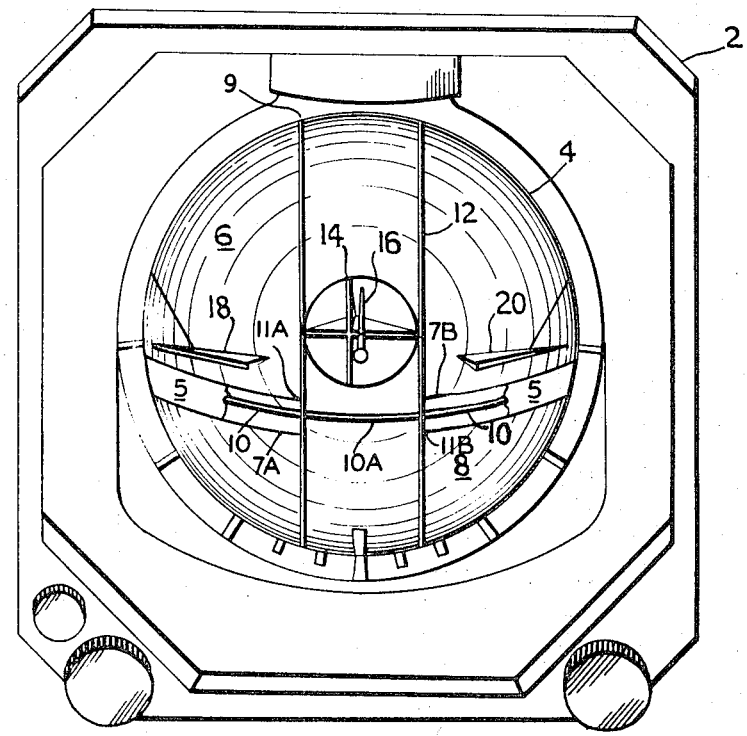
FIG. 1 is a pictorial representation of a flight instrument according to the invention, and which instrument displays information for guiding an aircraft during runway approach and landing.
Figure 3:
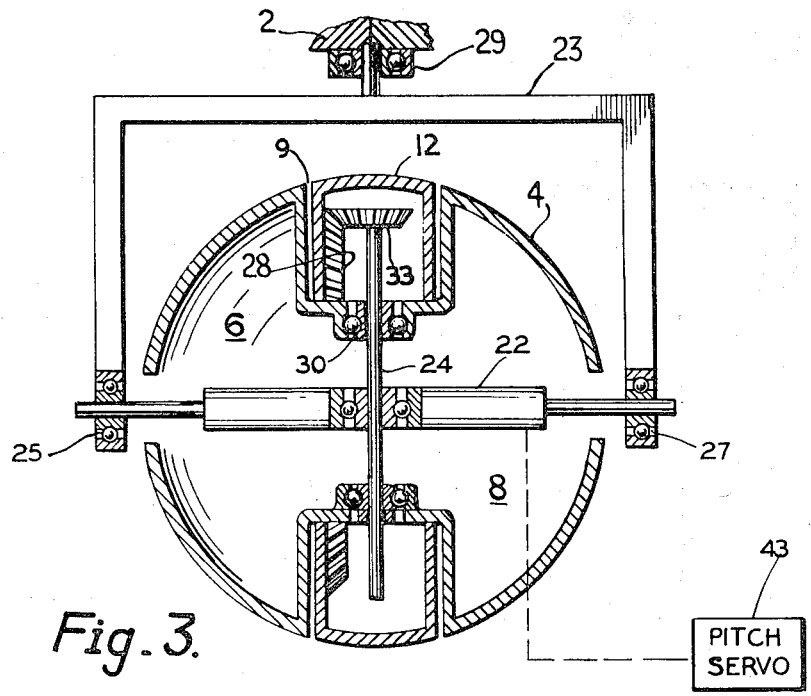
FIG. 3 is a sectional view showing the internal structure of the sphere shown in FIG. 2.

With reference to FIG. 1 there is shown a flight instrument including a case 2 which may be mounted in the instrument panel of an aircraft and having mounted therein a hollow sphere 4. Sphere 4 includes a pair of hemispherical cups 6 and 8. A center band 12 having mounted thereon a cross bar symbol 14 is positioned in a groove 9 on sphere 4 as best shown in FIG. 3 and extends circumferentially therearound in a vertical plane. The center of the cross bar symbol 14 represents the center of the glide slope and localizer beams. Center band 12 carries a suitably painted or otherwise applied horizon line 10A.

Figure 6:
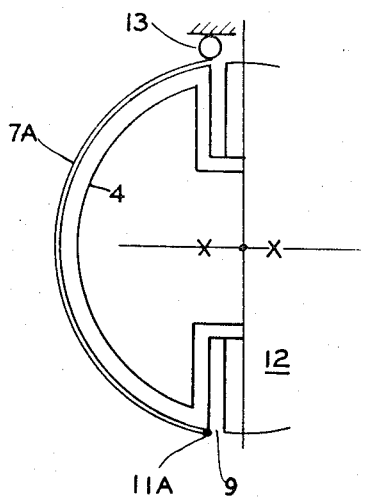
FIG. 6 is a partial diagrammatic representation showing the sphere of FIG. 2 viewed from the top.

A clearance space 5 separates hemispherical cups 6 and 8, beginning at the right and left front edges 11A and 11B of groove 9 and extending around the cups to the corresponding rear edges of the groove as shown in FIG. 6. Clearance space 5 permits displacement of sphere 4 about axis X—X shown in FIGS. 1 and 2 as will be hereinafter explained.

In order to provide a usable display in the viewing aperture of case 2, the portion of clearance space 5 within said viewing aperture must be covered. This is accomplished by roll-up tapes 7A and 7B. With reference to FIG. 6, tape 7A has a free end 11 mounted to the front edge 11A of groove 9 and extends clockwise around sphere 4 covering that portion of clearance space 5 and terminating at a spring loaded spool 13 near the corresponding rear edge of the groove so as to be drawn tight against the sphere. Tape 7B is similarly mounted and extends clockwise around sphere 4 likewise terminating at a spring loaded spool. It will now be understood that as sphere 4 is displaced about axis X—X, tapes 7A and 7B roll and unroll on their associated spools with clearance space 5 being thereupon opened to provide adequate clearance for said displacement and being covered to present a continuous display in the viewing aperture of case 2. Tapes 7A and 7B are colored to coincide with sphere 4 to provide camouflaging affect, and carry a suitably painted or otherwise applied horizon line 10 to coincide with horizon line 10A on center band 12.

A symbol 16 representing the actual aircraft is fixed in the viewing aperture of the indicator case 2 (FIG. 1) and flight director steering bars 18 and 20 are mounted for providing pitch and roll steering commands to guide the craft along a desired flight path.

In some respects the instrument of the present invention is similar to the device described in Publication No. 599–16B, published Nov. 15, 1959 by the Eclipse-Pioneer Division, now the Navigation and Control Division, of The Bendix Corporation, Teterboro, N.J., and which Bendix Corporation is the assignee of the present invention. The publication was copyrighted by The Bendix Corporation in 1960.

There is shown in FIG. 1, at page 3 of the referenced publication, an instrument having a viewing aperture with a cover glass thereover and an outline of an airplane maintained in a fixed center position on the glass. Symbol 16 may be likewise fixed in the viewing aperture of the instrument of the invention.

In FIG. 15, at page 18 of the referenced publication, there is shown a mechanical schematic diagram for command bar displacement in response to pitch and roll inputs. Steering bars 18 and 20 of the present invention are similarly mechanized and displaced.

Figure 2:
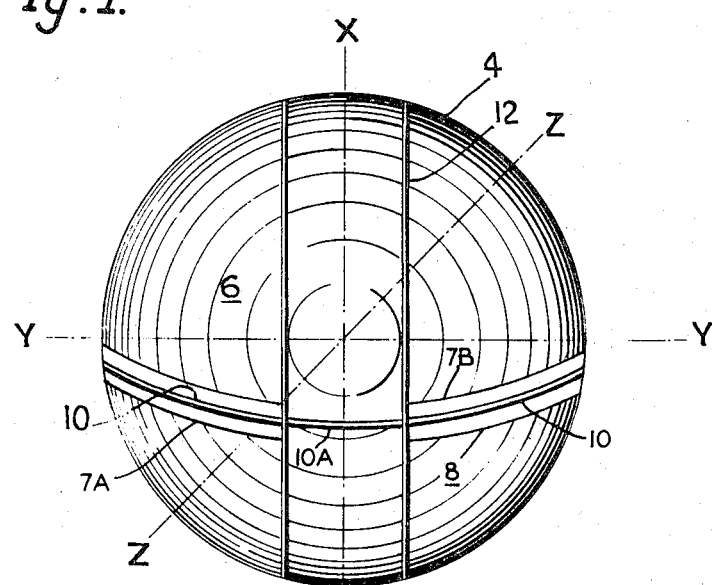
FIG. 2 is a diagrammatic representation showing a gimbal displaced 90° from its true axis of rotation for clarity in the drawing and a sphere included in the flight instrument of FIG. 1, and which sphere is mounted for movement about three mutually perpendicular axis.

With reference to FIG. 2, the sphere 4 is mounted for displacement about three mutually perpendicular axes X—X, Y—Y and Z—Z, and which Z—Z axis is in line with the fixed aircraft symbol 16 shown in FIG. 1. Displacement about the X—X axis corresponds to the displacement of the craft from a localizer beam, displacement about the Y—Y axis corresponds to the pitch attitude of the craft and to the displacement of the craft from a glide slope beam and displacement about the Z—Z axis corresponds to the roll attitude of the craft. The arrangement is such that the sphere 4 has unlimited motion about the Z—Z axis and unlimited motion about the Y—Y axis. The cups 6 and 8 and the center band 12 have limited motion about the X—X axis as heretofore noted and center band 12 has limited motion about the Y—Y axis. The cups 6 and 8, the symbol 14 and the flight director steering bars 18 and 20 are thus positioned with respect to the fixed aircraft symbol 16 for displaying the attitude of the aircraft, for displaying the displacement of the craft from the navigational beams and for providing the necessary steering commands.

The positioning of these components is servo controlled. Servos 40, 41, 43 and 45 shown in FIG. 4 include motor generators and control synchros. The servo input is obtained from remotely located sensors, i.e. localizer and glide slope receivers and pitch and roll gyros. A typical electric schematic for such servo control is shown in FIG. 12, at page 15, of the aforenoted referenced publication.

The flight instrument of the present invention is intended for use in either of two modes of flight, namely the cruise mode and the runway approach and landing mode wherein the craft follows navigational beams to the runway. As shown in FIG. 1, during the approach and landing mode, the center band 12 and the symbol 14 are within the viewing aperture of the case 2.

With reference to FIG. 3, a pitch mechanism plate 22 is mounted to the sphere 4 on the interior portion thereof so as to bisect the sphere 4 in a horizontal plane and is journaled in bearings 25 and 27 carried by a roll gimbal 23, and which roll gimbal 23 rotates about axis Z—Z but is shown displaced 90° therefrom for clarity in the drawing. Instrument case 2 carries a bearing 29, and the roll gimbal 23 is journaled in bearing 29 for rotation about the Z—Z axis shown in FIG. 2. The plate 22 is driven about the Y—Y axis in accordance with the pitch attitude of the craft and displaces the sphere 4 about said Y—Y axis. Plate 22 may be substantially rectangular in shape and has a width considerably less than the internal diameter of groove 9 so that there is adequate clearance when the plate is driven about the Y—Y axis.

During the approach and landing mode of flight the displacement symbol 14 shown in FIG. 1 must not move in response to the pitch attitude of the craft. A shaft 24 is journaled in a bearing 34 carried by the pitch mechanism plate 22 and is journaled in bearings 30 and 32 carried by the cups 6 and 8, respectively, of the sphere 4. Shaft 24 has a bevel gear 33 mounted to one end thereof, and which bevel gear 33 is in meshing engagement with a bevel gear 28 mounted to the center band 12 on the internal portion thereof. As plate 22, driven by pitch servo 43 displaces sphere 4 about the Y—Y axis, shaft 24 is simultaneously rotated about its axis by pitch servo 23 in response to changes in the pitch attitude of the craft so as to cancel out, through the action of the bevel gears 25 and 28, the rotation of center band 12. Center band 12 thus rotates about the Y—Y axis only in response to the displacement of the craft from a glide slope beam as will be hereinafter explained.

Figure 4:
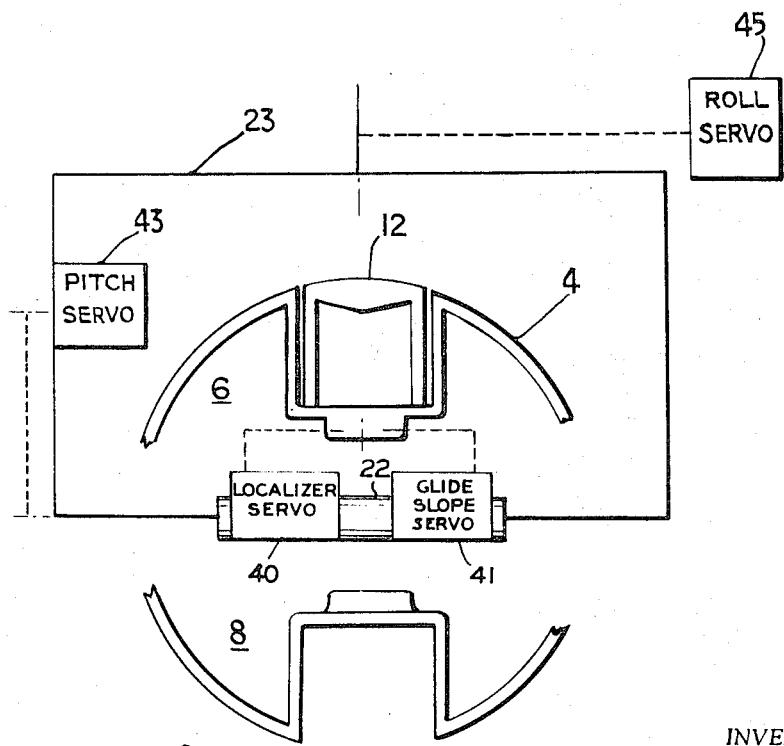
FIG. 4 is a diagrammatic representation showing the driving mechanism for the flight instrument of the present invention.

With reference to FIG. 4, the cups 6 and 8 are driven about the X—X axis shown in FIG. 1 by a localizer servo 40 mounted to the pitch mechanism plate 22. This motion tends to displace center band 12 about the Y—Y axis. To counteract this displacement, a glide slope servo 41 mounted to plate 22, and which glide slope servo 41, moves center band 12 about the Y—Y axis thus moving displacement symbol 14 vertically, receives a mechanical input from localizer servo 40. Displacement symbol 14, therefore, moves vertically with inputs from glide slope servo 41 and laterally with inputs from localizer servo 40. Sphere 4 is driven about the Y—Y axis by a pitch servo 43 mounted to roll gimbal 23 and is driven about the Z—Z axis (shown in FIG. 4 displaced 90° for purposes of example) by a roll servo 45. The entire mechanism is thus roll satbilized relative to the earth's horizon.

Figure 5:
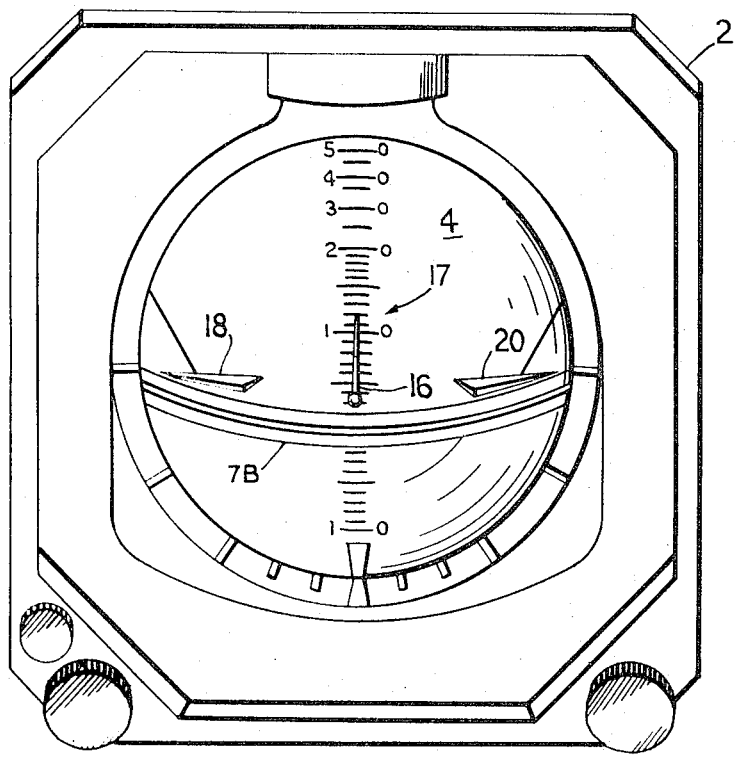
FIG. 5 is a pictorial representation of a flight instrument according to the invention, and which flight instrument displays information for guiding an aircraft during cruising.

In the cruising mode of operation it is desired to remove the center band 12 and the displacement symbol 14 included thereon from the viewing aperture of the case 2. This is accomplished by rotating the sphere 4 about the localizer displacement axis X—X so that the center band 12 and the displacement symbol 14 are hidden behind the instrument mask as shown in FIG. 5. Rotation of the sphere about axis X—X is possible because of the arrangement of clearance space 5 and roll-up tapes 7A and 7B heretofore described, and wherein tape 7B is shown indicating clockwise displacement of sphere 4 about axis X—X to hide center band 12. In this mode of operation the sphere 4 is appropriately marked along the vertical axis with a scale 17, and which scale 17 coincides with the fixed aircraft symbol 16 to indicate the pitch attitude of the craft.

The flight director steering bars 18 and 20 are arranged to move vertically in accordance with pitch commands and to move about the Z—Z axis in accordance with roll commands as described in the aforenoted reference publication, and whereby the pilot aligns the steering bars 18 and 20 with the fixed aircraft symbol 16 to place the craft on the desired flight path.

While the invention has been described in relation to displacement from localizer and glide slope beams it is to be noted that it is adaptable for displaying other displacement information as well. For example, center band 12 may carry a reference mark corresponding to the level of the ground and be driven about the Y—Y axis in accordance with the altitude of the craft whereby the displacement of the reference mark from the fixed aircraft symbol 14 corresponds to the height of the craft above the ground.

As heretofore noted, cups 6 and 8 and center band 12 have limited displacement about the X—X axis. This displacement is just enough to hide center band 12 when the instrument is used in the cruising mode and is a factor of the size of sphere 4 and the portion of the sphere visible through the viewing aperture of the instrument. Actually, an instrument constructed according to the invention as heretofore described provides a displacement of 69° in either the clockwise or counterclockwise directions, and this displacement is sufficient to remove band 12 from the viewing aperture.

Although only one embodiment of the invention has been illustrated and described, various changes in the form and relative arrangements of the parts, which will not appear to those skilled in the art may be made without departing from the scope of the invention. Reference is, therefore, to be had to the appended claims for a definition of the limits of the invention.

What is claimed is:

1. An attitude and displacement indicator for an aircraft, comprising:
   a case mounted to the aircraft and having a viewing aperture;
   a gimbal journaled in the case for displacement about a first axis;
   means for displacing the gimbal about the first axis in accordance with the roll attitude of the craft;
   a sphere including means mounted thereto for journaling the sphere in the gimbal for displacement about a second axis, and means associated with the sphere for permitting displacement of the sphere about a third axis and for permitting displacement of the sphere with the gimbal about the first axis;
   means for displacing the sphere about the second axis in accordance with the pitch attitude of the craft;
   means for displacing the sphere about the third axis in accordance with the displacement of the craft from a predetermined refernce;
   a movable band mounted circumferentially around the sphere for being displaced therewith about the first and third axis, and for being independently displaced about the second axis;
   means for displacing the band about the second axis relative to the sphere in accordance with the displacement of the craft from another predetermined reference; and
   said sphere and band being visable through the viewing aperture of the case, and cooperating to provide an integrated display of the pitch and roll attitude of the craft and of the displacement of the craft from the one and the other references.

2. An attitude and displacement indicator for guiding an aircraft during cruising and during runway approach and landing modes of flight, comprising:
   a case mounted to the aircraft and having a viewing aperture;
   a symbol fixed in the viewing aperture and representing the flight craft;
   a gimbal journaled in the case for displacement about a first axis in accordance with the roll attitude of the craft;
   a sphere including means mounted thereto for journaling the sphere in the gimbal for displacement about a second axis in accordance with the pitch attitude of the craft and the displacement of the craft from a glide slope beam, and means associated with the sphere for permitting displacement of the sphere about a third axis in accordance with the displacement of the craft from a localizer beam and for permitting displacement of the sphere with the gimbal about the first axis;
   a movable band centrally disposed on the sphere and having a symbol representing the center of the localizer and glide slope beams and including means mounted to the sphere for displacing the band with the sphere about the third axis and for displacing the band independent of the sphere about the second axis in accordance with the displacement of the craft from a glide slope beam; and
   said sphere and center band being visable through the aperture so that the attitude and displacement of the craft are displaced relative to the fixed aircraft symbol.

3. An indicator as described by claim 1 including:
   a symbol representing the craft and fixed in the viewing aperture of the case in line with the first axis of the case; and
   the pitch and roll attitude of the craft and the displacement of the craft from the one and the other predetermined references being indicated relative to the fixed symbol upon movement of the sphere and band.

4. An indicator as described by claim 1, wherein: displacement of the sphere about the third axis corresponds to displacement of the craft from a localizer beam; and
   displacement of the band about the second axis corresponds to displacement of the craft from a glide slope beam.

5. An indicator as described by claim 4, wherein: the band includes a symbol representing the center of the localizer and glide slope beams; and displacement of the craft from said beams corresponds to displacement of said symbol from the fixed aircraft symbol when the band moves with the sphere about the third axis and when the band moves independent of the sphere about the second axis.

6. An indicator as described by claim 2, including:
   means coupled to the band for preventing motion of said band about the second axis when the sphere moved about said second axis in accordance with the pitch attitude of the craft.

7. An indicator as described by claim 2, wherein: during the runway approach and landing mode of flight the band is within the viewing aperture of the case for displaying the displacement of the craft from the glide slope and localizer beams relative to the fixed symbol; and
   during the crusing mode of flight the sphere is displaced about the third axis for removing the band from the viewing aperture.

8. An indicator as described by claim 2, including. a horizon line extending circumferentially around the sphere so that displacement of the craft about the glide slope and localizer beams is displayed relative to the earth's horizon.

9. An indicator as described by claim 2, including: a pair of steering bars responsive to the pitch and roll attitude of the craft for being displayed about the first and second axis for providing pitch and roll steering commands and whereby the craft is guided to follow a desired course by aligning the steering bars with the fixed symbol.

References Cited

UNITED STATES PATENTS 3,094,971 6/1963 Guarind et al. _____ 73—178X

DONALD O. WOODIEL, Primary Examiner

U.S. Cl. X.R.

116—129